United States Patent
Byron et al.

(10) Patent No.: US 10,896,444 B2
(45) Date of Patent: Jan. 19, 2021

(54) DIGITAL CONTENT GENERATION BASED ON USER FEEDBACK

(71) Applicant: INTERNATIONAL BUSINESS MACHINES CORPORATION, Armonk, NY (US)

(72) Inventors: Donna K. Byron, Petersham, MA (US); Carmine M. DiMascio, West Roxbury, MA (US); Benjamin L. Johnson, Baltimore, MD (US); Florian Pinel, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 132 days.

(21) Appl. No.: 15/413,469

(22) Filed: Jan. 24, 2017

(65) Prior Publication Data
US 2018/0211286 A1 Jul. 26, 2018

(51) Int. Cl.
*G06Q 30/00* (2012.01)
*G06Q 30/02* (2012.01)
*G06N 20/00* (2019.01)
*G06F 16/35* (2019.01)

(52) U.S. Cl.
CPC ....... *G06Q 30/0269* (2013.01); *G06F 16/358* (2019.01); *G06N 20/00* (2019.01); *G06Q 30/0277* (2013.01)

(58) Field of Classification Search
None
See application file for complete search history.

(56) References Cited

U.S. PATENT DOCUMENTS

| | | | |
|---|---|---|---|
| 6,665,666 B1 * | 12/2003 | Brown | G06F 16/3338 |
| 7,631,327 B2 | 12/2009 | Dempski et al. | |
| 7,925,549 B2 | 4/2011 | Looney et al. | |
| 9,396,263 B1 * | 7/2016 | Unger | G06F 16/951 |
| 9,542,496 B2 * | 1/2017 | Dettman | G06F 16/9535 |
| 10,262,062 B2 * | 4/2019 | Chang | G06F 16/35 |
| 10,417,314 B2 | 9/2019 | Petti | |

(Continued)

FOREIGN PATENT DOCUMENTS

WO 01/93161 A1 12/2001

OTHER PUBLICATIONS

Understanding Your Customers—How Demographics and Psychographics Can Help, Jun. 16, 2016, Penn State Extension (Year: 2016).*

(Continued)

*Primary Examiner* — Naresh Vig
(74) *Attorney, Agent, or Firm* — Conley Rose, P.C.

(57) ABSTRACT

A computer program product for computer generation of digital content, said computer program product comprising a computer readable storage medium having program instructions embodied therewith, the program instructions executable by a processing resource to cause the processing resource to determine demographic designators associated with users of user devices that render interactive digital contents; group together similar input questions input into the interactive digital contents of the user devices; for each group of similar questions, create an answer to each group of similar questions; create a script from each answer; record each script and the corresponding group of similar input questions in a data repository; and insert a script from the data repository into a digital content template.

19 Claims, 4 Drawing Sheets

(56) References Cited

U.S. PATENT DOCUMENTS

| | | |
|---|---|---|
| 2002/0077903 A1 | 6/2002 | Feldman |
| 2003/0154126 A1 | 8/2003 | Gehlot |
| 2007/0089129 A1 | 4/2007 | Verhaegh et al. |
| 2007/0136745 A1 | 6/2007 | Garbow et al. |
| 2007/0162944 A1 | 7/2007 | Khare et al. |
| 2007/0255552 A1* | 11/2007 | Thiesson .............. G06F 16/9535 704/8 |
| 2008/0320512 A1 | 12/2008 | Knight |
| 2009/0019471 A1 | 1/2009 | Rabinovitch et al. |
| 2009/0259642 A1 | 10/2009 | Cao et al. |
| 2010/0306738 A1 | 12/2010 | Verman |
| 2012/0078888 A1* | 3/2012 | Brown .............. G06F 17/30654 707/723 |
| 2012/0150633 A1* | 6/2012 | Chung ............... G06Q 30/0241 705/14.49 |
| 2013/0013615 A1* | 1/2013 | Brown .................... A61B 5/00 707/741 |
| 2014/0365502 A1 | 12/2014 | Haggar et al. |
| 2014/0377735 A1* | 12/2014 | Byron ..................... G09B 7/00 434/362 |
| 2015/0324904 A1* | 11/2015 | Starikova .............. G06F 40/106 705/35 |
| 2018/0052664 A1* | 2/2018 | Zhang ............... G06F 16/90332 |
| 2019/0205938 A1* | 7/2019 | Van Winkle ....... G06Q 30/0269 |

OTHER PUBLICATIONS

Office Action dated Jun. 19, 2019 U.S. Appl. No. 15/627,176, filed Jun. 19, 2017, 26 pages.

"List of IBM Patents or Applications Treated as Related," dated Jun. 28, 2019, 2 pages.

Office Action dated Nov. 12, 2019 Appl. No. 15/627,176, filed Jun. 19, 2017, 18 pages.

Notice of Allowance dated Jun. 10, 2020, Appl. No. 15/627,176, filed Jun. 19, 2017; 15 pages.

Office Action dated Feb. 25, 2020 Appl. No. 15/627,176, filed Jun. 19, 2017, 12 pages.

* cited by examiner

US 10,896,444 B2

DIGITAL CONTENT GENERATION BASED ON USER FEEDBACK

BACKGROUND

The present invention relates to digital content generation, and more specifically, to the generation of digital content determined to be relevant to viewers of the digital content.

Digital content is generated and transmitted to user devices such as televisions, personal computers, smart phones, and the like. The content may be intended to provide information relevant and useful to the viewer and consumer of the content. However, consumers of content may vary tremendously in their preferences and thus content of interest to one consumer may not be at all of interest to another consumer, and vice versa.

SUMMARY

In another embodiment, a system includes one or more compute devices configured to execute an interactive content generator and a script generator as well as one or more storage devices configured to store a demographic and query/answer database and a script database. The interactive content generator is configured to generate interactive digital content, receive input questions through the interactive digital content, determine demographic designators associated with the questions, group together similar input questions, and for each group of similar questions, create an answer and store each answer and the corresponding group of similar input questions in the demographic and query/answer database. The script generator is configured to create a script from each answer and record each script in the script database.

In yet another embodiment, a computer program product is provided for computer generation of digital content. The computer program product includes a computer readable storage medium having program instructions embodied therewith. The program instructions are executable by a processing resource to cause the processing resource to determine demographic designators associated with users of user devices that render interactive digital contents and group together similar input questions input into the interactive digital contents of the user devices. For each group of similar questions, the instructions cause the processing resource to create an answer to each group of similar questions, create a script from each answer, record each script and the corresponding group of similar input questions in a data repository, and insert a script from the data repository into a digital content template.

DETAILED DESCRIPTION

As noted above, digital content can be generated and provided to consumers of the content, but such content may not be of interest to all consumers. In accordance with the disclosed embodiments, the digital content is customized based on target demographic inputs and historical data, which indicate topics of interest to consumers that align with the target demographics. In some embodiments, a system records questions submitted by users to digital interactive content as well as a demographic designator of each such user. The questions indicate the topics of interest to the users and can be organized by the demographic designators. During subsequent generation of digital content for a target demographic group of users, the system can modify a digital content template to include a script, which includes data deemed to be of interest to the target demographic group based on questions previously recorded for the same demographic group. In some embodiments, the digital interactive content as well as the subsequent digital content (generated based on questions submitted by users via the interactive content) may represent advertisements for goods and/or services, but can be indicative of other types of information.

Figure 1:
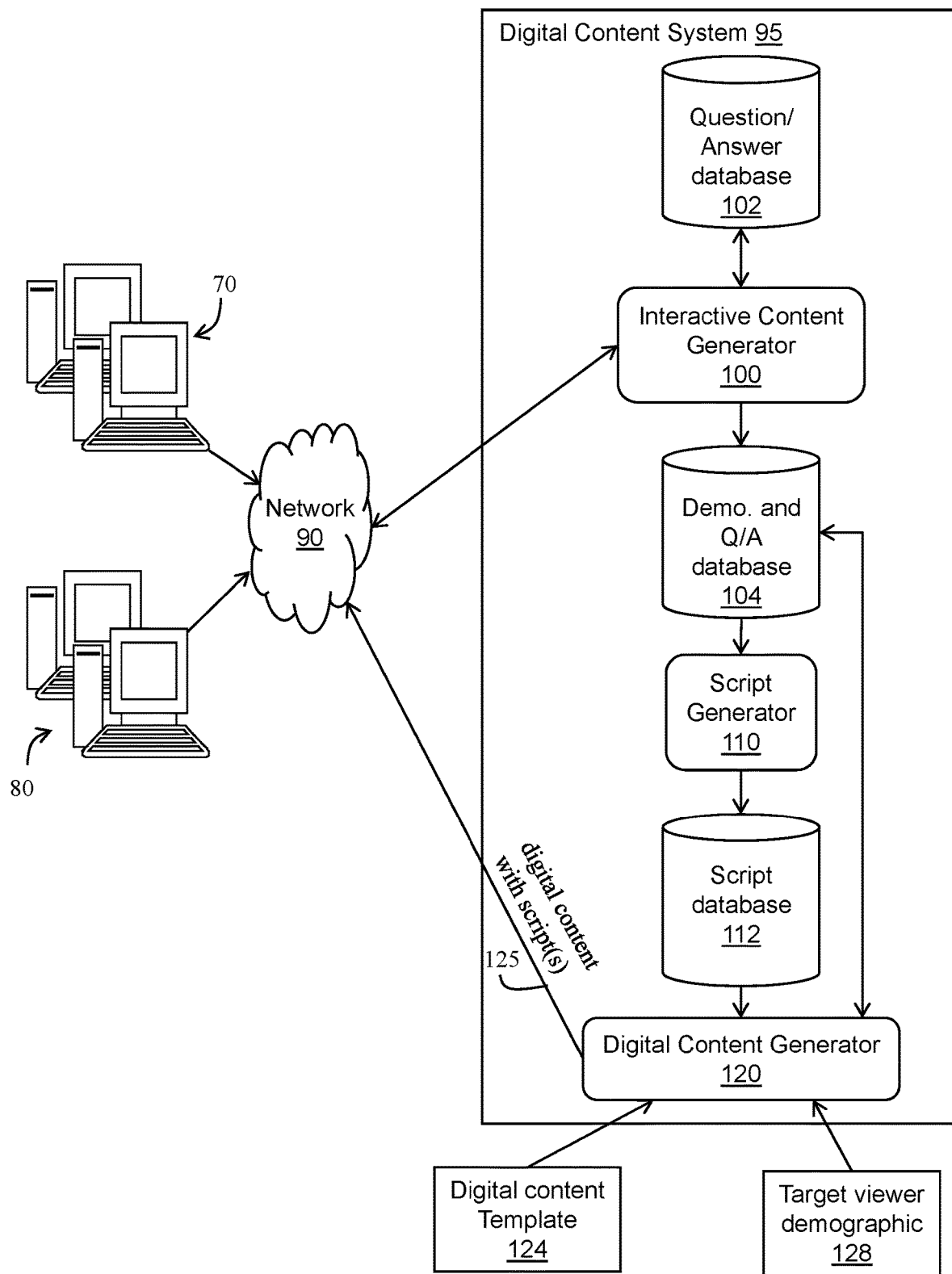
FIG. 1 shows a system in accordance with various embodiments for generating digital content.

With reference now to FIG. 1, an embodiment of a digital content system 95 is shown coupled to one or more user devices 80 and one or more viewer devices 80 by way of a network 90. Network 90 may be one or more of a public network (e.g., the Internet), local area networks (LANs), wide area networks (WANs), wired or wireless networks, etc. The user devices 70 may comprise personal computers (e.g., desktop computers, notebook computers, etc.), smart phones, tablet devices, personal digital assistants (PDAs), or any other type of computing device that permits a user to interact with the device. The user devices 70 may include one or more hardware processors, memory, non-volatile storage (hard disk drive, solid state storage drive, etc.), network interfaces, etc. and may include an operating system and a network interface application such as a web browser or other type of application. Through the web browser or other type of application, a user can view digital content of interest to the user and interact with such digital content.

The viewer devices 80 also may comprise personal computers (e.g., desktop computers, notebook computers, etc.), smart phones, tablet devices, personal digital assistants (PDAs), or any other type of computing device that permits a user to interact with the device. In some embodiments, the viewer devices 80 may comprise televisions, which receive and display broadcast content (cable broadcasts, satellite broadcasts, etc.).

The digital content system 95 may comprise one or more compute devices and one or more storage devices. The compute devices may comprise server computers ("servers") and each server may include computer hardware such as processors, memory, network interfaces, etc. and executes machine instructions which implement the functionality described herein.

In the example of FIG. 1, the digital content system 95 includes an interactive content generator 100, a question-answer database 102, a demographic and question-answer database 104, a script generator 110, a script database 120, and a digital content generator 120. The interactive content generator 100, script generator 110, and digital content generator 120 may be implemented as one or more servers executing machine instructions. The question-answer database 102, demographic and question-answer database 104, and script database 120 may be implemented on one or more storage devices.

The interactive content generator 100 generates interactive digital content to be transmitted to and played on user devices 70. In some embodiments, the interactive digital content includes product or service advertisements, but in general, includes any type of information content deemed to possibly be of interest to users of the user devices 70. In some embodiments, the interactive digital content may comprise a web page that is rendered on the user device via a web browser executing on the user device. In other embodiments, the interactive digital content is text, graphics, audio, etc. that is rendered within an application (other than a browser) executing on the user device, such as an "app" executing on a smart phone. The interactive digital content may include information presented to the user of the user device such as text, graphics, audio, video, etc. pertaining to, for example, a product or a service potentially of interest to the user of the user device, or other type of information. The interactive digital content also may include a user field in which the user can submit or select a question of interest to the user related to the product or service described by the interactive digital content. The user field may include a text field in which the user can free-form type a question about the product/service. For example, if the product described in the interactive digital content is a vehicle such as a truck, the user might be interested in the towing capacity of the vehicle. The user then may use an input device included as part of the user device 70 to submit the question. The input device may be, for example, a keyboard of a computer, a touch screen "soft" keyboard on a smart phone, etc.

The interactive content generator may retrieve data that represents the interactive digital content from a storage device or directly from another server and then may process or format the data for transmission to and rendering on the user devices 70. The users of the user devices 70 observe (e.g., watch, read, listen to, etc.) the interactive digital content on their user devices 70. If a user wishes to receive additional information about some aspect of the interactive digital content (e.g., information about a product or service described in the content), the user submits a question to the interactive digital content such as a character string which specifies the user's question. The character string may comprise a fully formed sentence or a fragment of a sentence. Continuing with the above example, the character string might be "What is the towing capacity of the vehicle?"

The user-supplied question is received by the interactive content generator 100. The interactive content generator 100 generates an answer to the user's question and transmits the answer back to the user device for playback within the interactive digital content. For example, the answer may include text, graphics, audio, video, etc. that provides information relevant to the question submitted by the user. For example, the answer may comprise a voice overlay that is played back through speakers of the user device 70. In the embodiment of FIG. 1, the question-answer database 102 may include a plurality of records, with each record containing a mapping between a question and an answer. The questions and corresponding answers may be predetermined and/or based on historical questions previously submitted by other users. The interactive content generator 100 may receive the question from the user device 70 and determine whether a match to a question in the question-answer database 102 exists. In some embodiments, the interactive content generator 100 may include or may have access to a natural language processing unit that can determine key words in the user's question and compare such key words to key words included in the question-answer database 102. Upon determining that a match is present in the question-answer database, the interactive content generator 100 retrieves the corresponding answer from the database and provides the answer to the user device for inclusion in the interactive digital content as noted above.

In other embodiments, the interactive content generator 100 may generate the answer to the user's question in other manners. For example, the questions can be answered by a question/answering system such as IBM Watson™. In some embodiments, a question and answer system may provide answers to input questions by ingesting a large corpus of documentary data, annotating the data, and generally processing thy: data before-hand to generate structured information from structured and unstructured electronic documents. With a QA system such as Watson™, a question is received, the system parses the question and analyzes it to determine what is being asked for, and then performs a search of its ingested data from the corpus to identify candidate answers for the input question, determine confidence scores for the candidate answers based on analysis of evidentiary information, and the like.

The interactive content generator 100 also determines a demographic designator of the user that submitted the question through the interactive digital content. The demographic designator may include one or more of a variety of indicators including, for example, generator, age (or age range), location of the user device (as a proxy for the location of the user), educational background (high school education, undergraduate degree, graduate degree, etc.), and/or any other type of classifier deemed of interest to producers of digital content. Such demographic information may be determined in any of a variety of ways. For example, location can be provided by a mobile device or by an internet protocol (IP) address lookup. If the user has been authenticated, the digital content site might have access to a user profile from which a location can be determined.

Upon determining one or more demographic designators for a user that has submitted a question to an interactive digital content as well as an answer for the question, the interactive content generator 100 adds a record to the demographic and question/answer database 104. The added record may include the demographic designator(s) for the user and the user's question and answer. Additional information may be included as well in the record. For example, the demographic and question/answer database may include or otherwise keep track of the number of times (and/or frequency) that each question or group of similar questions is asked by members of a common demographic group. Thus, the script database 112 contains information from which the most frequently asked questions within individual demographic groupings can be determined.

The script generator 110 may retrieve records from the demographic and question/answer database 104. For one or more of the retrieved records, the script generator 110 may generate a script for the answer in the record. The script may comprise a single phrase or multiple phrases, and generally has meaning to the viewer of the script without having apriori knowledge of the original question that led to the answer and to the script. The script may include an alphanumeric character string, audio, video, etc. For a single retrieved record, the script generator also may generate several scripts of different lengths, or using different media (text, audio, video). The script generator may generate the scripts by starting with the entire answer to the question. The answer then can be summarized, depending on the requirements of the content where it will be inserted. In some embodiments, summarizing the answer may include identifying the type of question (e.g., question requesting a fact as answer as opposed to an opinion, closed ended question, open ended question, etc.) to be summarized and then generating one or more answer summaries according to the question type.

The script generator 110 stores the scripts, or references to the scripts, in the script database 112. Along with each script in the script database 112, the script generator 110 may include the corresponding demographic designator.

The script database 112 thus includes a plurality of scripts. Further, each script represents information deemed to be of interest to a particular demographic group of users based on historical questions and answers for that particular demographic group. Subsequently, when it is desired to generate digital content to target a group of users characterized by a particular demographic designator, the digital content generator 120 may receive as an input a digital content template 124. The digital content template 124 may include a web page, video, audio, a combination of a web page with various audio and video components, etc. The digital content template 124 may be provided to the digital content system 95 by a content provider that desires to have the digital content system generate digital content based on the input template that is customized to a certain demographic grouping of people based on topics that similar users have indicated to be of interest. The target viewer demographic 128 also may be provided to the digital content generator. This input may be in the form of, for example, an argument included in an application programming interface (API), an input value specified or selected in a graphical user interface, or any other type of input mechanism.

The digital content generator 120 selects a script from the script database 112 based on the input target viewer demographic 128, and modifies the digital content template 124 to include the selected script from the script database 112. For example, the digital content template may pertain to a certain product such as a sport utility vehicle (SUV). The target viewer demographic may include people from warmer climates that are between 35 and 50 years of age. The digital content generator 120 then accesses the demographic and question/answer database 104 to determine a frequently asked question and answer for members of the target viewer demographic 128 and based on the subject of the digital content template. In the current example, the digital content generator 120 accesses the demographic and question/answer database 104 to determine a frequently asked question about SUVs by people in warmer clients that are between 35 and 50 years of age. The digital content generator 120 may determine the most frequently asked question matching that criteria, or may select a question at random (or otherwise) from, for example, the top five most frequently asked questions that match the criteria.

Once the digital content generator 120 determines the question and corresponding answer based on the input digital content template 124 and target viewer demographic, the digital content generator accesses the script database 112 to select a corresponding script (i.e., a script corresponding to the answer). The digital content generator 120 then may insert the script into the digital content template.

The digital content template 124 may include one or more elements that can be replaced with scripts. For example, the template may include an embedded tag that specifies where a video or audio clip is to be inserted. The digital content generator 120 then may insert the script selected from the script database 112 into the digital content template 124 at the location identified by the embedded tag. The template may include multiple tags, for example, one tag for a video clip and another tag for text to be displayed in the content. Two scripts (one video and the other text) may be retrieved from the script database 112 and inserted into the template the relevant locations. The resulting digital content template 124 containing the inserted script(s) is illustrated in FIG. 1 as digital content with script(s) 125. In some embodiments, no embedded tag is present, and instead the generator inserts the script where it can. For example, text caption can be inserted anywhere, audio can be inserted in blanks, video can be inserted at the end or between scene transitions, etc. In some embodiments, a script can be inserted into a commercial. A commercial may comprise several scenes. The script may be inserted as a caption in one of the scenes. In another example, a script is used to overwrite the voiceover for one of the scenes. Further, the script may be rephrased to fit the length of the scene. The voice-over playback speed may be modified to fit the length of the sequence. In another embodiment, the question answering system may have produced multiple answers of different lengths that we can choose from which to align with the video clip's length. In yet other embodiments, a new sequence may be inserted altogether. If access to additional video footage that has been tagged with keywords is available, the digital content generator may look up an additional scene whose contents matches the subject of the question being answered, insert the scene, and render the script as voiceover.

A viewer (e.g., a person) may use a viewer device 80 and, through the viewer device, may view content (e.g., streamed video, web pages, etc.) generated by a content producer. The demographic designator of the viewer may be determined as described above. The viewer's demographic designator may be determined by, for example, the digital content generator 120. Once the viewer's demographic designation is determined, the digital content generator 120 may transmit, or cause to be transmitted, the digital content with script(s) 125 pertaining to that particular demographic designation to the viewer device of the corresponding viewer. That is, the digital content generator 120 may generate a plurality of digital content with script(s) 125 for various products/services and various demographic designators and transmits the digital content with script(s) customized for a particular demographic designator to the viewer device of the viewer having the matching demographic designator.

The content may include digital content containing scripts generated by the digital content generator 120 as described above. Alternatively, the digital content containing the scripts may be played directly on the viewer device 80 as a solo presentation (i.e., not as part of a broadcast, web site, etc.). The resulting digital content 125 can then be transmitted through the network 90 for playback on a viewer device 80. In some embodiments, the viewer device 80 may comprise any type of computer (e.g., notebook, desktop, etc.), a mobile device such as a smart phone, or any other type of network-connected device. In yet other embodiments, the viewer device includes a television and the television's receiver such as a cable or satellite box may have a communication link through network 90 to the digital content system 95.

Figure 2:
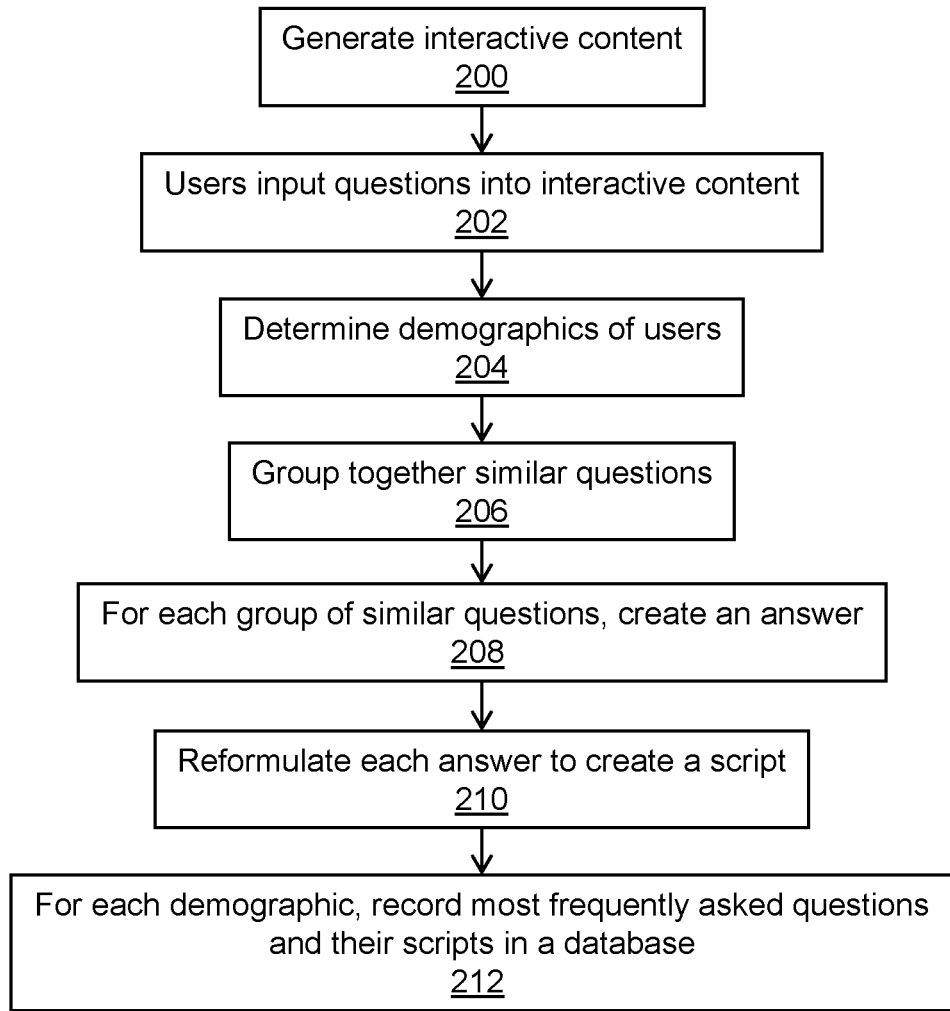
FIG. 2 is a method in accordance with various embodiments for determining frequently asked questions within interactive digital content for various demographic designations.

FIG. 2 illustrates a method in accordance with various embodiments. The operations may be performed in the order shown, or in a different order. Further, the operations may be performed sequentially, or two or more of the operations may be performed concurrently. At 200, the method includes generating interactive digital content. The content may be, for example, an advertisement for a product or service. The content may include a web page rendered on a user device 70 using, for example, a browser executing on the user device. The content may be generated for rendering within an application other than a browser executing on the user device. The generated interactive digital content may include images, text, audio, video, etc. about a topic such as a product, and may include an input field such as a text input field through which a user can type or otherwise select a question about the topic of the interactive digital content. The generated interactive digital content may be generated by a server and transmitted to a user device via a network (e.g., the Internet).

At 202, the method includes the one or more of the users, who view the generated digital content, inputting questions into their respective copies of the interactive digital content on their user devices 70. As explained above, a user may input the question by free-form typing a question via an input device (e.g., a touch screen, keyboard, etc.) of the user device. In some examples, the user may select a question from a list of questions displayable in the interactive digital content. The question input by the users may be received by the interactive content generator 100.

At 204, the method includes determining the demographics of users of the user devices inputting the questions. The demographics may include one or more demographic designators such as location (predicted, for example, from the internet protocol (IP) address of the user device), age (e.g., based on age or birthdate information a user may have already provided a content service entity during a registration process), race or ethnic background (similarly provided through a registration process), educational background, etc. The interactive content generator 100 may have access to a user demographic database and retrieves one or more demographic designators based on information such as an IP address collected from a user or a who has input a question or the user's user device.

At 206, the method includes grouping together similar questions. Any one or more of the techniques described above can be used to perform this operation. For example, the method may include the use of machine learning algorithms such as natural language classifying or natural language clustering. For each group of similar questions, at 208 the method includes creating answer. Answer creation may use a database of questions and answers as noted previously.

At 210, the method includes reformulating the answer created at 208 to create, for example, a script. Examples of such techniques are illustrated above. At 212, for each user demographic, the method includes recording the n (an integer greater than or equal to 1) most frequently asked questions and their corresponding scripts into a database (e.g., script database 112). A corresponding demographic designator also may be stored in the database mapped to the question and script. This operation may include recording all questions and their scripts into the database along with an indicator of the frequency with which each question has been asked.

Figure 3:
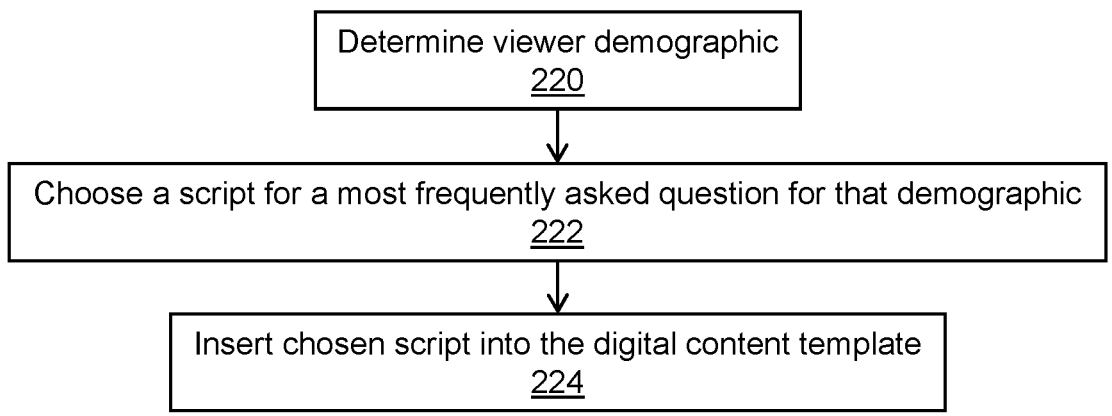
FIG. 3 is a method in accordance with various embodiments for using the determined frequently asked questions to customize digital content based on target demographic designations.

FIG. 3 illustrates a method directed to producing digital content customized for a given demographic designator. The operations may be performed in the order shown, or in a different order. Further, the operations may be performed sequentially, or two or more of the operations may be performed concurrently.

At 220, the method includes determining one or more demographic designators of a viewer of digital content. Any of a variety of techniques can be employed in this regard, such as those discussed above. At 222, the method includes choosing a script from a database (e.g., script database 112) corresponding to the demographic designator determined at 220. The script may be chosen also based on the most frequently asked question for the viewer's demographic association as explained above. At 224, the method includes inserting the script into a digital content template to produce content for distribution to the viewer. The content has been customized to include information likely to be of interest to the viewer based on historical questions and answers of people with similar demographics to the viewer.

Figure 4:
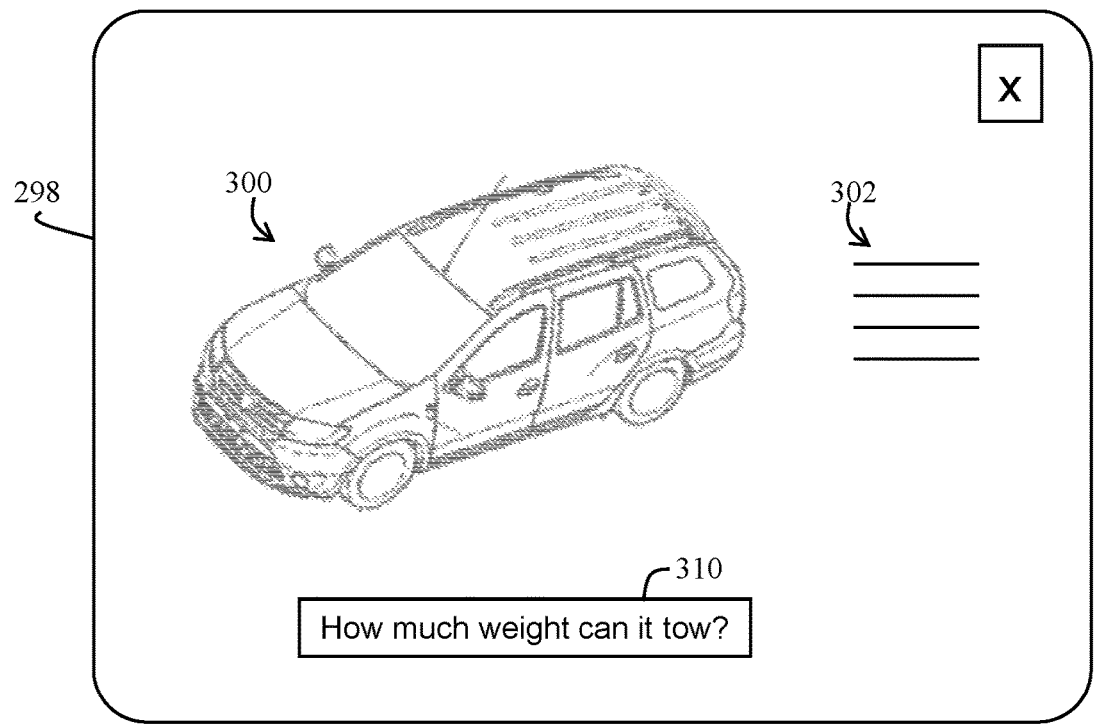
FIG. 4 shows an example of interactive digital content in which a user can submit a question.
Figure 5:
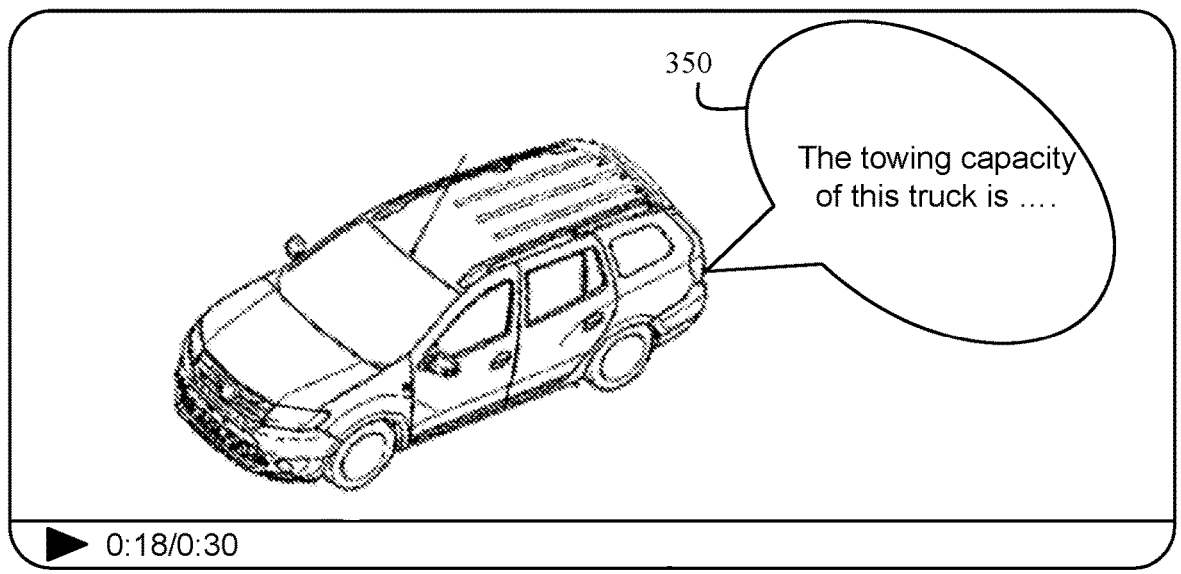
FIG. 5 shows an example of customized digital content containing information determined to be of interest to users associated with a particular demographic designator.

FIGS. 4 and 5 illustrate an example of the use of the embodiments described herein. In this example, the digital content includes information indicative of an advertisement for a product. The representation in FIG. 4 may be a web page 298 viewed on a display of a user device 70. The web page 298 includes a graphical user interface in which an image of an SUV 300 is shown. Textual information 302 also may be displayed on the graphical user interface such as product information about the particular SUV (e.g., gas mileage, warranty information, etc.). An example of a question input field 310 also is shown. A user of the user device viewing the web page can type a question into the input field 310. In this example, the user has typed the question "How much weight can it tow?". In some embodiments, instead of typing questions, users could also may consult a list of frequently asked questions (FAQs), and the system may record which FAQ the users accessed.

Once the digital content system 95 receives this question and similarly written questions by other users having similar demographic designators, the system may determine that users in that particular demographic grouping may be primarily interested in the towing capacity of that particular SUV, or SUVs in general. As such, when an SUV supplier (e.g., manufacturer, vendor, etc.) wants to produce digital content about that SUV, such content can be customized to include information determined to be of particular interest to individual demographic groupings. Thus, if a viewer with a similar demographic designator to the user that submitted the question in FIG. 4 is to be presented with digital content pertaining to the SUV, the digital content generator 120 of the digital content system 95 can modify a template as noted above to include a script containing information about the towing capacity of the SUV. FIG. 5 shows an example of an advertisement for the same product (SUV in this example). This content has been customized to include a textual overlay 350 that contains information about the towing capacity of the SUV. The overlay 350 may include a textual character string in some embodiments, but in other embodiments may include audio, video, etc. The example of FIG. 5 is a 30 second commercial in which towing information about the SUV has been inserted.

Instead of, or in addition to, generating digital content for rendering on a display, the digital content may be implemented on print media such as newspapers, magazines, printed ads from 3D printers, etc.

Figure 6:
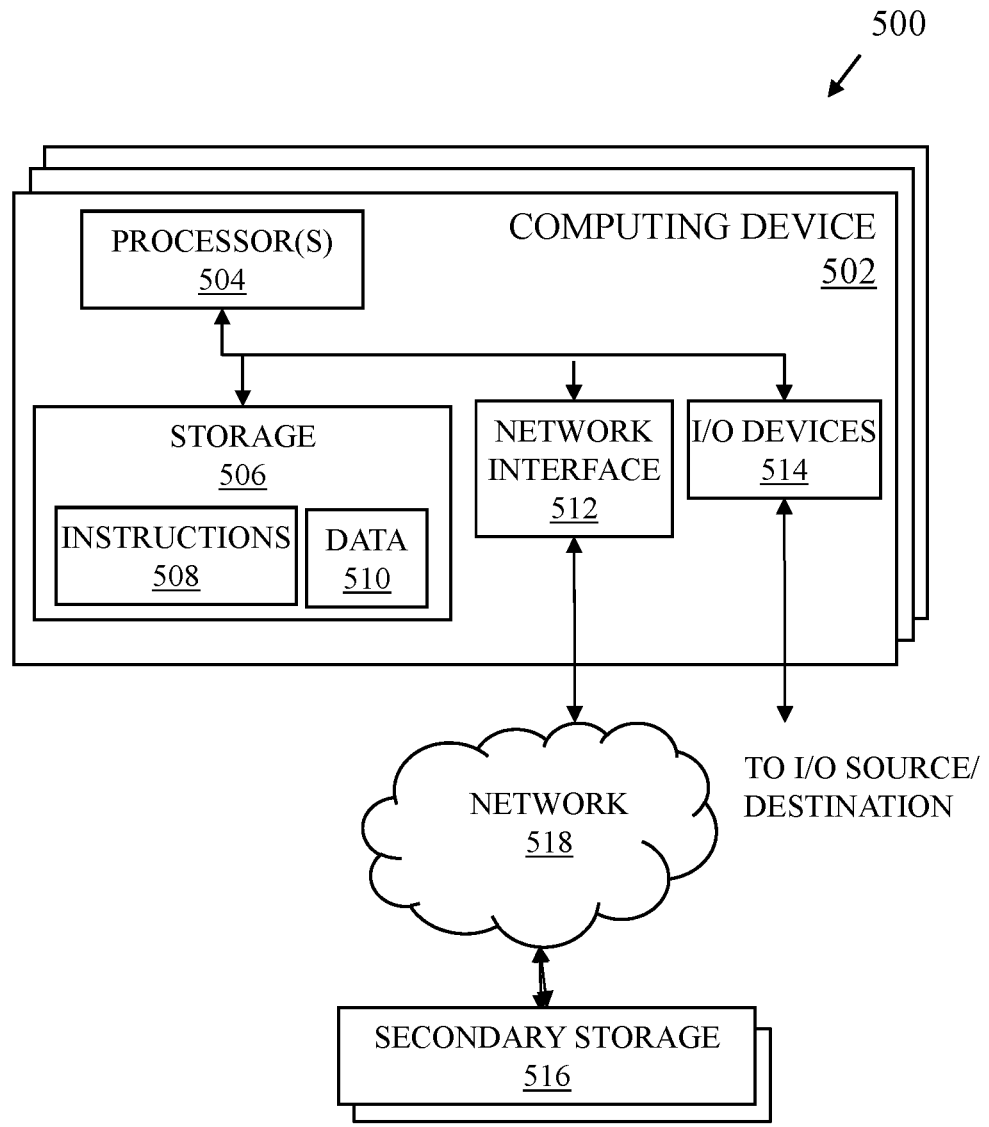
FIG. 6 shows a computing system in accordance with various embodiments.

FIG. 6 shows a schematic diagram for a computing system 500 suitable for implementation of the digital content system 95 including the interactive content generator 100, the script generator 110, and the digital content generator 120 as well as the various databases, as described herein in accordance with various embodiments. The system includes one or more computing devices 502. The computing system 500 includes the computing devices 502 and secondary storage 516 communicatively coupled together via a network 518. One or more of the computing devices 502 and associated secondary storage 516 may be used to provide the functionality of the various services and databases described herein.

Each computing device 502 includes one or more processors 504 coupled to a storage device 506, network interface 512, and I/O devices 514. In some embodiments, a computing device 502 may implement the functionality of more than one component of the system 100. In various embodiments, a computing device 502 may be a uniprocessor system including one processor 504, or a multiprocessor system including several processors 504 (e.g., two, four, eight, or another suitable number). Processors 504 may be any suitable processor capable of executing instructions. For example, in various embodiments, processors 504 may be general-purpose or embedded microprocessors implementing any of a variety of instruction set architectures ("ISAs"), such as the x86, PowerPC, SPARC, or MIPS ISAs, or any other suitable ISA. In multiprocessor systems, each of processors 504 may, but not necessarily, commonly implement the same ISA. Similarly, in a distributed computing system such as one that collectively implements the provider network 100, each of the computing devices 502 may implement the same ISA, or individual computing nodes and/or replica groups of nodes may implement different ISAs.

The storage device 506 may include a non-transitory, computer-readable storage device configured to store program instructions 508 and/or data 510 accessible by processor(s) 504. The storage device 506 also may be used to store the machine images as explained above. The storage device 506 may be implemented using any suitable volatile memory (e.g., random access memory), non-volatile storage (magnetic storage such as a hard disk drive, optical storage, solid storage, etc.). Program instructions 508 and data 510 implementing the functionality disclosed herein are stored within storage device 506. For example, instructions 508 may include instructions that when executed by processor(s) 504 implement the various services and/or other components of the service provider's network disclosed herein.

Secondary storage 516 may include additional volatile or non-volatile storage and storage devices for storing information such as program instructions and/or data as described herein for implementing the various aspects of the service provider's network described herein. The secondary storage 516 may include various types of computer-readable media accessible by the computing devices 502 via the network 518. A computer-readable medium may include storage media or memory media such as semiconductor storage, magnetic or optical media, e.g., disk or CD/DVD-ROM, or other storage technologies. Program instructions and data stored on the secondary storage 516 may be transmitted to a computing device 502 for execution by a processor 504 by transmission media or signals via the network 518, which may be a wired or wireless network or a combination thereof. Each of the interactive content generator 100, the script generator 110, and the digital content generator 120 as well as the various databases and other components described herein may be implemented as a separate computing device 502 executing software to provide the computing node with the functionality described herein. In some embodiments, some or all of the various services may be implemented by the same computing device.

The network interface 512 may be configured to allow data to be exchanged between computing devices 502 and/or other devices coupled to the network 518 (such as other computer systems, communication devices, input/output devices, or external storage devices). The network interface 512 may support communication via wired or wireless data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 514 may include one or more display terminals, keyboards, keypads, touchpads, mice, scanning devices, voice or optical recognition devices, or any other devices suitable for entering or retrieving data by one or more computing devices 502. Multiple input/output devices 514 may be present in a computing device 502 or may be distributed on various computing devices 502 of the system 500. In some embodiments, similar input/output devices may be separate from computing device 502 and may interact with one or more computing devices 502 of the system 500 through a wired or wireless connection, such as over network interface 512.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
one or more storage devices configured to store a demographic and query/answer database and a script database;
an interactive content generator coupled to the storage devices and configured to:
generate interactive digital content for playback on a user device, wherein the interactive digital content includes information determined to be of potential interest to the user and having a format enabling the user to interact with the interactive digital content via the user device;
receive input questions through the interactive digital content;
determine demographic designators associated with the questions;
group together similar input questions; and
create an answer for each group of similar input questions, the answer corresponding to at least one of the determined demographic designators;
store each answer and the corresponding group of similar input questions along with an association to at least one of the determined demographic designators in the demographic and query/answer database for each group of similar questions;
a script generator coupled to the storage devices and configured to:
create a script from each answer, wherein each script is media that is one or more of audio data, video data, text data, or graphics data; and
record each script in the script database along with an association to the corresponding at least one of the determined demographic designators and the corresponding group of similar input questions; and a digital content generator coupled to the storage devices and configured to:
    receive a digital content template from a content provider, wherein the digital content template is received from a content provider to cause the system to generate digital content by modifying the digital content template according to a determined target demographic;
    select a script from the script database based on the target demographic, wherein the script is selected based on the answers stored by the interactive content generator in response to interaction with the interactive digital content;
    modify the digital content template according to the selected script to include media of the selected script to create an instance of the digital content template targeted to the target demographic; and
    transmit the modified digital content template.

2. The system of claim 1, wherein the digital content template includes information indicative of a commercial.

3. The system of claim 1, wherein the script generator is further configured to record each script into the script database along with a demographic designator.

4. The system of claim 3, wherein the digital content generator is further configured to determine a viewer demographic for use as the target demographic and select from the script database the script to be inserted using the determined viewer demographic.

5. The system of claim 1, wherein the interactive content generator is further configured to group together similar input questions through at least one of machine learning and natural language clustering.

6. The system of claim 1, wherein the interactive content generator is further configured to create an alphanumeric character stream that represents the answer to each group of similar questions through access of a database of questions and answers and selection of an answer from the database.

7. The system of claim 1, wherein the digital content generator modifies the digital content template according to the selected script to include media of the selected script by:
    detecting an embedded tag included in the digital content template, the embedded tag specifying where the selected script is to be inserted into the digital content template; and
    inserting the selected script into the digital content template at the location specified by the embedded tag.

8. The system of claim 7, wherein the digital content generator further modifies the digital content template according to a second selected script to include media of the second selected script by:
    detecting a second embedded tag included in the digital content template, the second embedded tag specifying where the second selected script is to be inserted into the digital content template; and
    inserting the second selected script into the digital content template at the location specified by the second embedded tag.

9. The system of claim 7, wherein inserting the selected script into the digital content template at the location specified by the embedded tag includes merging the selected script with the digital content template.

10. The system of claim 7, wherein inserting the selected script into the digital content template at the location specified by the embedded tag includes removing and overwriting at least a portion of the digital content template with the selected script.

11. A computer program product for computer generation of digital content, said computer program product comprising a computer readable storage medium having program instructions embodied therewith, the program instructions executable by a processing resource to cause the processing resource to:
    receive input questions via interactive digital contents rendered by user devices;
    determine demographic designators associated with users of the user devices that render the interactive digital contents, wherein the interactive digital contents include information determined to be of potential interest to the users and having a format enabling the users to interact with the interactive digital content via the user devices;
    group together similar input questions input into the interactive digital contents of the user devices;
    create an answer to each group of similar questions, the answer corresponding to at least one of the determined demographic designators;
    create a script from each answer, wherein each script is media that is one or more of audio data, video data, text data, or graphics data;
    record each script along with an association to the corresponding at least one of the determined demographic designators and the corresponding group of similar input questions in a data repository;
    receive a digital content template, wherein the digital content template is received from a content provider to cause the system to generate digital content by modifying the digital content template according to a determined target demographic;
    select a script from the data repository based on the target demographic, wherein the script is selected based on the answers stored by the interactive content generator in response to interaction with the interactive digital content;
    generate the digital content by modifying the digital content template according to the selected script to target the digital content to the target demographic; and
    transmit the modified digital content template.

12. The computer program product of claim 11, wherein the program instructions cause the processing resource to:
    include a demographic designator with each script recorded into the data repository;
    determine a viewer demographic; and
    use the determined viewer demographic to select from the data repository the script to be inserted.

13. The computer program product of claim 11, wherein each demographic designator is indicative of at least one of age, location of the user device, and educational background.

14. The computer program product of claim 11, wherein the program instructions cause the processing resource to group together similar input questions through at least one of machine learning and natural language clustering.

15. The computer program product of claim 11, wherein the program instructions cause the processing resource to create the script to represent an answer to each group of similar questions through access of a database of questions and answers and selection of an answer from the database.

16. The system of claim 1, wherein the digital content generator modifies the digital content template according to the selected script to include media of the selected script by:
    determining a location suitable for insertion of the selected script, where the location is not identified by an embedded tag; and inserting the selected script into the digital content template at the determined location.

17. The system of claim 1, wherein the script generator creates a plurality of scripts from each answer, and wherein each of the plurality of scripts varies in media type or length.

18. The system of claim 1, wherein the digital content generator modifies the selected script prior to modifying the digital content template according to the selected script to include media of the selected script, and wherein the modification of the script is performed based on an available amount of time for presenting the script.

19. The system of claim 1, wherein the media of the script is media configured to have a meaning to a member of the target demographic without the member of the target demographic prior knowledge of the input question that led to the answer and to the script.

\* \* \* \* \*